(12) United States Patent
Shimizu et al.

(10) Patent No.: US 6,339,675 B1
(45) Date of Patent: Jan. 15, 2002

(54) SYNCHRONIZATION LAG CONTROL APPARATUS AND METHOD

(75) Inventors: Yoshinori Shimizu, Tokyo; Akira Hasegawa, Kanagawa; Masayoshi Mizuno; Takayuki Ishida, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/037,304

(22) Filed: Mar. 9, 1998

(30) Foreign Application Priority Data

Mar. 19, 1997 (JP) .............................. 9-067076

(51) Int. Cl.[7] .......................... H04N 5/928; H04N 5/935
(52) U.S. Cl. ......................................... 386/98; 386/104
(58) Field of Search ........................... 386/98, 96, 104, 386/109, 111, 112, 124, 105, 106, 125, 126, 46, 45, 39, 40, 27, 33, 85, 84, 54, 66, 71, 2

(56) References Cited

U.S. PATENT DOCUMENTS 5,583,652 A * 12/1996 Ware ............................ 386/75
6,098,046 A * 8/2000 Cooper et al. .............. 704/503

* cited by examiner

*Primary Examiner*—Robert Chevalier
(74) *Attorney, Agent, or Firm*—Frommer Lawrence & Haug LLP; William S. Frommer

(57) ABSTRACT

Conventionally, a particular countermeasure has been taken for each of the error factors. That is, each error requires a circuit and the like for carrying out the countermeasure, which leads to an increase size of the entire circuit.

The present invention includes a controller 14 which resets a system time clock STC serving as the system reference time with a time management information PTM in a video decoder 7. This reset time is compared to a time management information PTM or DTM of the video decoder 7 or an audio decoder 11. According to a result of the comparison, the synchronization lag between the video signal and the audio signal is controlled.

10 Claims, 4 Drawing Sheets

SYNCHRONIZATION LAG CONTROL APPARATUS AND METHOD

BACKGROUND OF THE INVENTION

1. Field of the Invention

The present invention relates to a synchronization lag control apparatus and method for controlling a synchronization lag between a video signal and an audio signal when reproducing a multiplexed information signal formed from a coded video signal and a coded audio signal.

2. Description of the Prior Art

In various storage methods of particular contents such as package media and broadcasting, there may arise an error during reproduction by a reproduction apparatus.

For example, in a reproduction apparatus for reproducing a video signal from a digital video disc (DVD) containing audio/video signal compression-coded by way of the MPEG (Moving Picture Experts Group) 2 method of data compression technique (hereinafter, this compression technique will be referred to as MPEG2) or other discs containing video signals, there arise various errors including an incorrectable error of an error correction code due to fingerprints or scars on the disc, temporary disability of data read out due to an external shock, bugs in control circuits such as various decoders, an error caused by that a compressed data such as a multiplexed data, video data, and audio data is not matched with the format.

Conventionally, in the aforementioned disc reproduction apparatus, each of the aforementioned error factors was coped with respectively for evasion of the errors and adverse affects. For this, various circuits are required to cope with the respective errors, which has increased the entire circuit size.

Moreover, in a case when an error cannot be recovered completely by the corresponding means, even if the synchronization (AV synchronization) between an audio data and a video data is obtained at a reproduction start, there arises a lag in the AV synchronization as the time lapses.

The AV synchronization lag may be caused by use of an external synchronization signal, for example, when a video synchronization signal from an external device has a phase not matched with the clock used in the reproduction apparatus, or when changing the speed control in a so-called Karaoke, or when continuously decoding discontinuous audio frames called audio gap in the aforementioned DVD.

SUMMARY OF THE INVENTION

It is therefore an object of the present invention to provide a synchronization lag control apparatus and method capable of preventing errors with a reduced circuit size without preparing particular countermeasures for respective error factors.

There can be considered various error factors, which finally cause an AV synchronization lag. There are also error factors which directly cause the AV synchronization lag.

As for the errors which causes the aforementioned AV synchronization lag, no particular countermeasures are taken. Instead, by detecting an AV synchronization lag, the synchronization lag is corrected.

For correcting the AV synchronization lag, the AV synchronization is established by skip/repeat/halt and restart of a video signal with respect to an audio signal. It is also possible to carry out skip/repeat/halt and restart of an audio signal. However, for the human sense, the skip/repeat/halt and restart of an audio signal causes a strong feeling of disorder compared to that of a video signal. Consequently, as has been described above, the quality of reproduction is maintained as good as possible by carrying out skip/repeat/halt and restart of a video signal with respect to an audio signal.

In order to achieve the aforementioned object, the synchronization lag control apparatus according to the present invention employs control means for resetting a system time clock serving as a system reference time with a time management information in video decoding means, so that this reset time is compared to a time management information of video decoding means or audio decoding means, so as to control a synchronization lag between a video signal and an audio signal according to a result of the comparison.

Moreover, in order to achieve the aforementioned object, the synchronization control method according to the present invention employs control means for resetting a system time clock serving as a system reference time with a time management information used in decoding a video signal, so that this reset time is compared to a time management information of video decoding means or audio decoding means, so as to control a synchronization lag between the video signal and the audio signal according to a result of the comparison.

Moreover, in order to achieve the aforementioned object, the synchronization lag control apparatus according to the present invention employs control means for resetting a system time clock serving as a system reference time with a time management information in video decoding means, so that this reset time is compared to a time management information of the video decoding means or audio decoding means, so as to use a result of the comparison for matching a decoding timing of the video signal with a decoding timing of the audio signal.

Moreover, in order to achieve the aforementioned object, the synchronization control method according to the present invention employs control means for resetting a system time clock serving as a system reference time with a time management information used in decoding a video signal, so that this reset time is compared to a time management information of video decoding means or audio decoding means, so as to use a result of the comparison for matching a decoding timing of the video signal with a decoding timing of the audio signal.

DETAILED DESCRIPTION OF THE PREFERRED EMBODIMENTS

Description will now be directed to a synchronization lag control apparatus and method according to the present invention with reference to the attached drawings.

This apparatus is a large-capacity optical disc reproduction apparatus (hereinafter, referred to as a DVD reproduction apparatus) for reproducing a large-capacity optical disc such as a digital versatile disc (DVD-Video) containing audio/video signals which have been compression-coded by the data compression technique (hereinafter, referred to as MPEG2) by way of the MPEG (Moving Picture Experts Groups) 2 method. Especially, the DVD used here contains a coded video signal, a coded sub video signal as a sub picture (SP), and a coded audio signal which are multiplexed.

Figure 1:
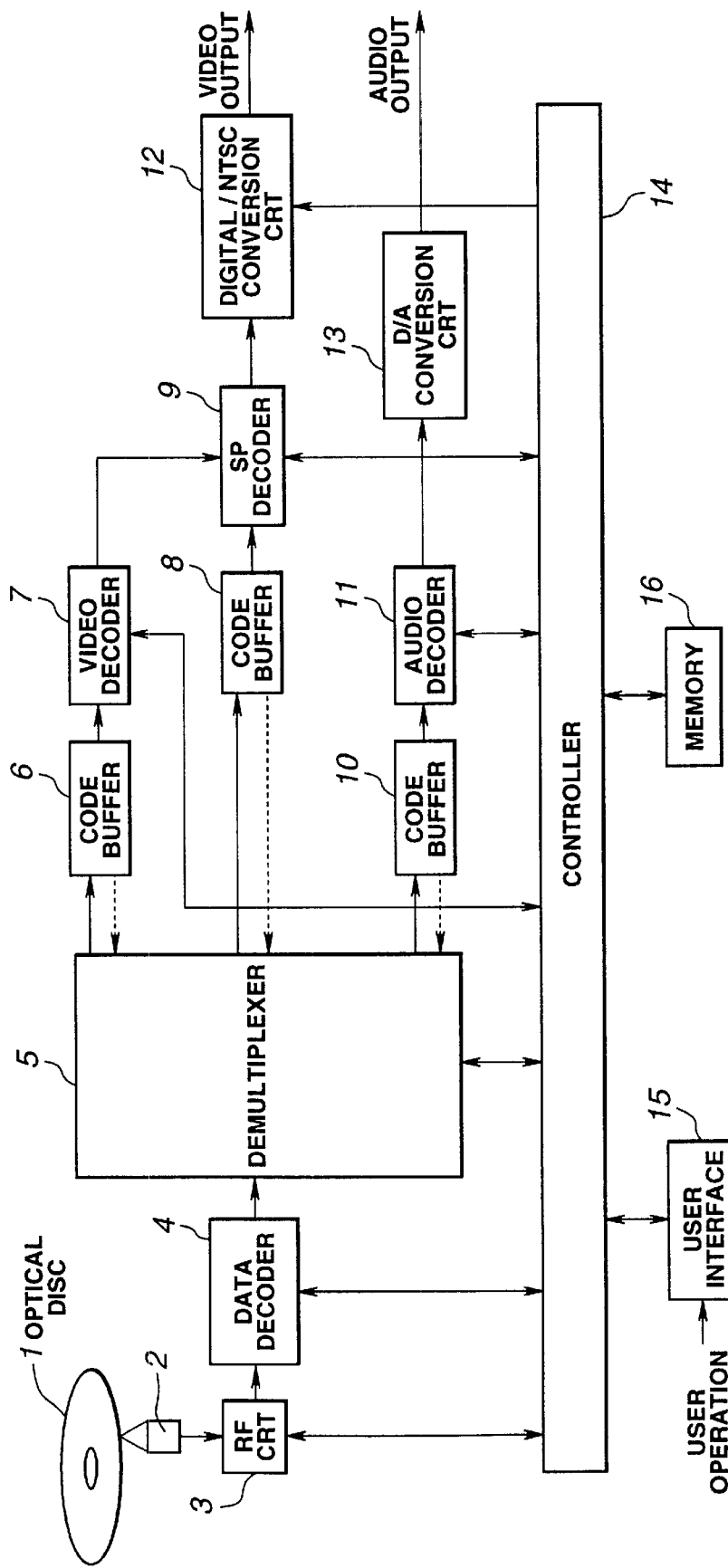
FIG. 1 is a block diagram showing a DVD reproduction apparatus including a synchronization lag control apparatus according to an embodiment of the present invention.

As shown in FIG. 1, the aforementioned DVD reproduction apparatus includes: a pickup 2 for reproducing an RF signal from the DVD 1; an RF circuit 3 which is supplied with the RF signal reproduced by this pickup 2 and carries out binarization to this RF signal; a data decoder 4 which is supplied with the reproduction data from the RF circuit 3 and carries out a decoding such as error correction; a demultiplexer 5 which is supplied with the reproduction data decoded by the data decoder 4 and isolates from the reproduction, a coded video data, a coded SP data, and a coded audio data; a code buffer 6 for temporarily storing the coded video data from this demultiplexer 5; a video decoder 7 for decoding, i.e., spreading, the coded video data from the code buffer 6; a code buffer 8 for temporarily storing the coded SP data from the demultiplexer 5; an SP decoder 9 for decoding the coded SP data from this code buffer 8; a code buffer 10 for temporarily storing the coded audio data from the demultiplexer 5; and an audio decoder 11 for decoding the coded audio data from the code buffer 10.

Moreover, this DVD reproduction apparatus includes a digital/NTSC, PAL conversion circuit (hereinafter, referred to as NTSC conversion circuit) 12 for receiving the coded video data and the SP data from the SP decoder 9 and converting data into an NTSC signal or PAL signal; and a digital/analog conversion circuit (hereinafter, referred to as D/A conversion circuit) 13 which is supplied with the coded audio data from the audio decoder 11 and converts the data into an analog signal.

Furthermore, the DVD reproduction apparatus includes: a controller 14 for controlling the pickup 2, the RF circuit 3, the data decoder 4, the demultiplexer 5, the video decoder 7, the SP decoder 9, the audio decoder 11, the NTSC conversion circuit 12, and the D/A conversion circuit 13; a user interface 14 for interfacing the controller 14 with the user operation input; and a memory 16 serving as a data storage section of the controller 14.

In the aforementioned system using the MEPG2, a program stream (PS) constituting one program is used for recording/reproducing a multiplexed information signal, and a plurality of programs called a transport stream (TS) are used for recording/reproducing a multiplexed information signal.

Each of the decoding/reproduction unit called access unit of the video and audio data constituting the aforementioned PS has a time management information called time stamp indicating the moment of time for decoding/reproduction. According to this time stamp, each of the decoders controls decoding. The time stamp may be a presentation time stamp (PTS) which is a reproduction output time management information and a decoding tine stamp (DTS) which is a decoding time management information. Actually, in the video and audio decoders, the aforementioned PTS and DTS are compared to the current system time clock (STC) and when they are matched, decoding and display are started.

Moreover, prior to the video and audio decoders, there is provided the demultiplexer 5 for isolating a video data and an audio data from the PS read out from the DVD 1. In this demultiplexer 5, a system clock reference (SCR) value of each pack consisting of a plurality of packets is compared to the current STC, and when the current STC has become equal to the SCR, the pack is transferred to the aforementioned decoders.

Moreover, this DVD reproduction apparatus may employ the technique disclosed in the Japanese Patent Application Hei 3-230975 filed by the applicant of the present invention that, without the comparison between the SCR and the STC, a signal indicating whether the code buffers of the aforementioned decoders are full is transmitted to the demultiplexer and the demultiplexer transmits a data unless the signal indicates Full, so that a data can be supplied without causing overflow of the code buffers.

In FIG. 1, the controller 14 resets the system time clock STC serving as the system reference time with the time management information PTM in the video decoder 7. This reset time is compared to the time management information PTS or the DTS of the video decoder 7 or the audio decoder 11, so as to control the synchronization lag between the video signal and the audio signal according to a result of the comparison.

More specifically, resets the system time clock STC serving as the system reference time with the time management information PTM in the video decoder 7, and compares this reset time to time management information PTS or DTS of the video decoder 7 or the audio decoder 11, and according to a result of the comparison, matches the decoding timing of the video signal with the decoding timing of the audio signal.

Figure 2:
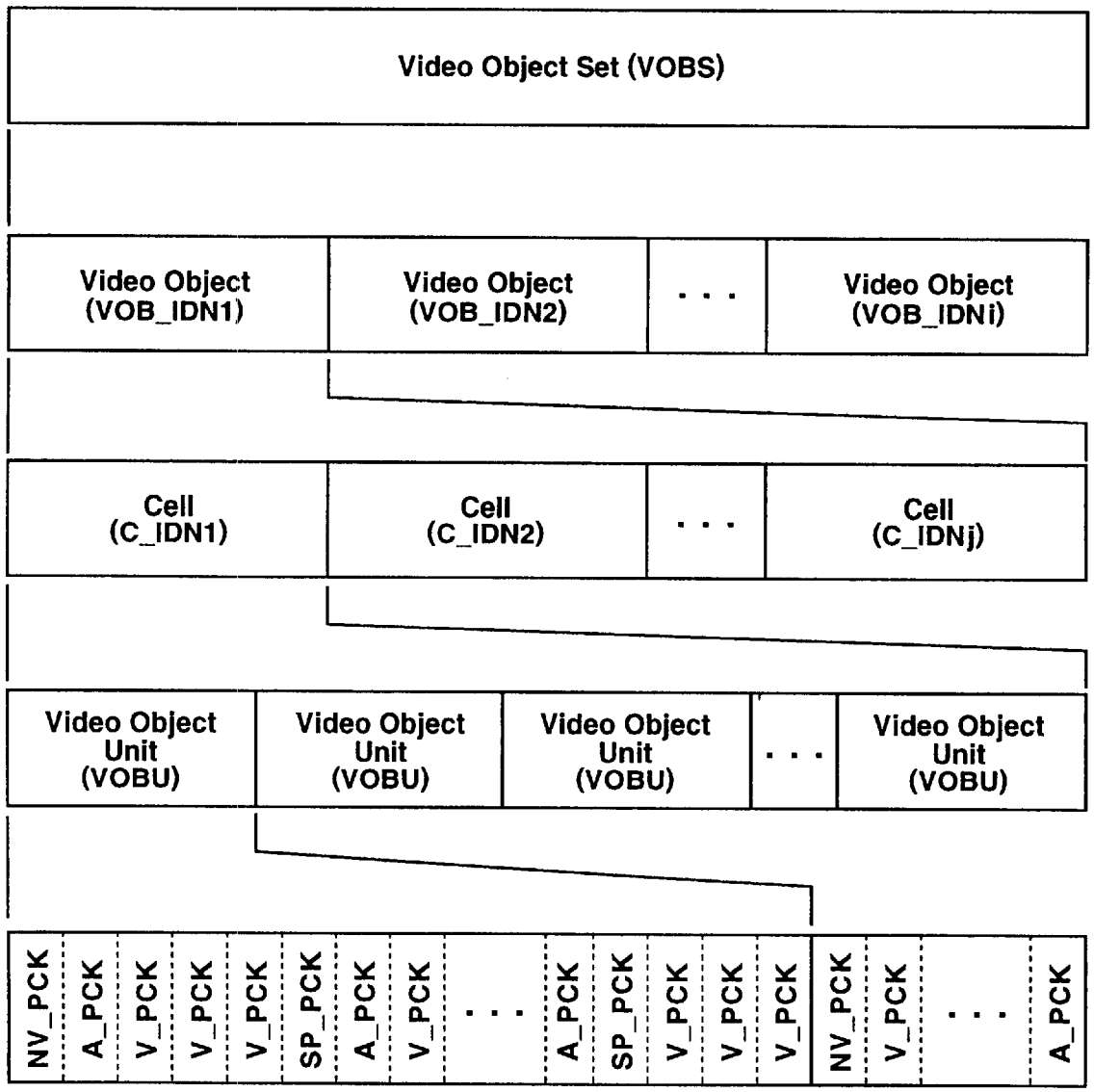
FIG. 2 shows a recording format of the aforementioned DVD.

As shown in FIG. 2, the aforementioned DVD is recorded, for example, on video object set (hereinafter, referred to as VOBS) basis used as a unit such as one movie work. The VOBS consists of a plurality of video objects (hereinafter, referred to as VOB). In the DVD, for example, there is provided a multi-story format which enables to see one movie in a plurality of stories. Such a function is realized through this VOB unit.

Each VOB consists of a plurality of cells. A cell may constitute, for example, one scene of a movie. That is, a combination of scenes becomes a VOB. Various combinations of the scenes realize the aforementioned multi-story function. The multi-story function is a technique to record a plurality of stories in the DVD in advance, so that the user can select stories through a menu displayed during a reproduction.

A cell consists of a plurality of video object units (VOBU). A VOBU is a unit corresponding to 0.4 to 1.2 seconds of animation pictures and includes a group of pictures (hereinafter, referred to as GOP) in the MPEG2 format. It should be noted that is often a case that cells are not recorded on the DVD in the reproduction order and the information of the cell reproduction order and recording position is recorded in the program chain information (PGCI) area on the DVD.

Moreover, a VOBU consists of a navigation pack (NV_PCK), an audio pack (A_PCK), a sub-picture pack (SP_PCK), and a video pack (V_PCK) consisting of a video data which has been compression-coded by the MPEG2 method.

Here, the navigation pack consists of a pack header, a system header, a presentation control information (PCI) packet (PCI_PCK), and a data search information (DSI) packet (DSI_PCK).

The PCI packet contains a plurality of video data reproduction control information called PCI general information (PCI_GI).

Moreover, the DSI packet contains a plurality of data search information for the respective data. In order to reproduce a VOB and the following VOB in seamless, the seamless playback information (SML_PBI) is used. This SML_PBI may be VOB_V_S_PTM indicating a reproduction time of a VOB video start and VOB_V_E_PTM indicating a reproduction time of a VOB video end.

The operation of this DVD reproduction apparatus will be detailed below.

In this DVD apparatus, the STC of the system reference time of the stream multiplexed by the MPEG system indicates the video display time. That is, at a reproduction start, firstly, the aforementioned PTS indicating the video display start time and the DTS indicating the decode start time are directly set in the STC or values calculated according to the PTS and the DTS values are set in the STC.

In the DVD, the navigation pack also contains the VOBU_S_PTM and VOB_V_S_PTM indicating the video display start time and it is possible to set these values directly or set values calculated according to these values.

Upon a video decode/display start, the aforementioned STC start count up with a 90 KHz clock. After this, the video decoder 7 continues video decoding and display while the STC counts according to the 90 KHz clock. If the aforementioned PTS and DTS are found in the video data, the direct values or the values calculated according to these values are used to reset load the aforementioned STC. Thus, the aforementioned STC always shows the video display time.

Figure 3:
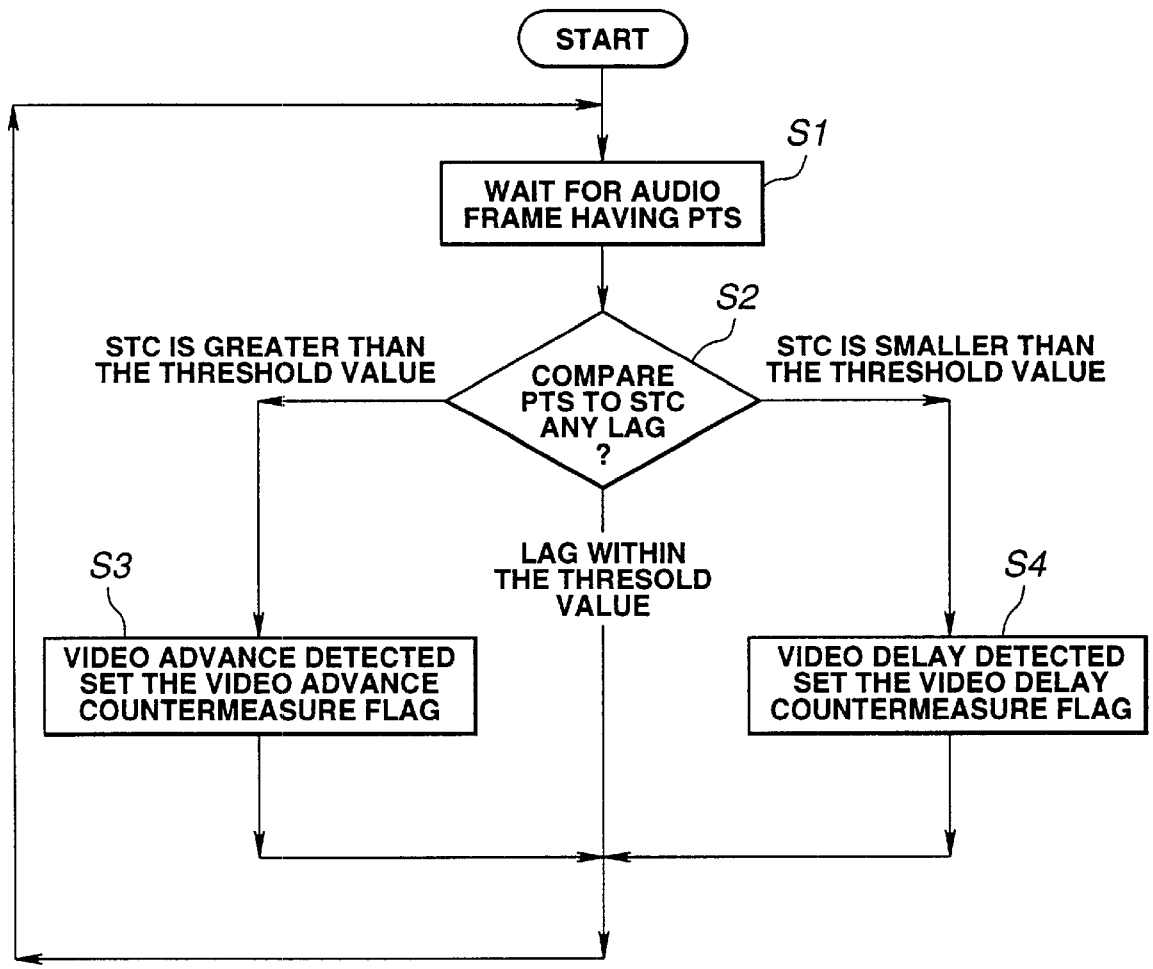
FIG. 3 is a flowchart showing a synchronization lag detection procedure carried by the aforementioned DVD reproduction apparatus.

After the video decoding and display start, i.e., after the STC which has been reset starts the count up, the controller 14 makes the audio decoder 11 decode and reproduce an audio data. After an audio decoding is started, as shown in FIG. 3, in step S1, the system waits for an audio frame having a PTS, and in step S2, the audio PTS is compared to the video time STC.

According to a result of the comparison in step S2, if the audio PTS and STC are respectively within threshold values, nothing is carried out. If a lag equal to or more than the threshold value is detected, the video decoder 7 and the STC are operated for carrying out the processing of step S3 or S4, so that the lag is within the threshold value.

Here, for example, a 2-field (1-frame) time is set as the threshold value "a" of STC advance with respect to the audio PTS, and 0 is set as the threshold value "b" for the delay. It should be noted that these threshold values "a" and "b" may not be fixed values but values calculated from the bit rate of the stream currently reproduced or data amounts of the code buffers of the respective decoders.

In a case when the difference between the STC and the audio PTS is greater than the aforementioned threshold value "a", it means that the video has advanced and in step S3, the controller 14 turns on a video advance countermeasure flag. Moreover, if the difference between the STC and the audio PTS is smaller than the threshold value "b", it means that the video has delayed and in step S4, a video delay countermeasure flag is turned on.

Figure 4:
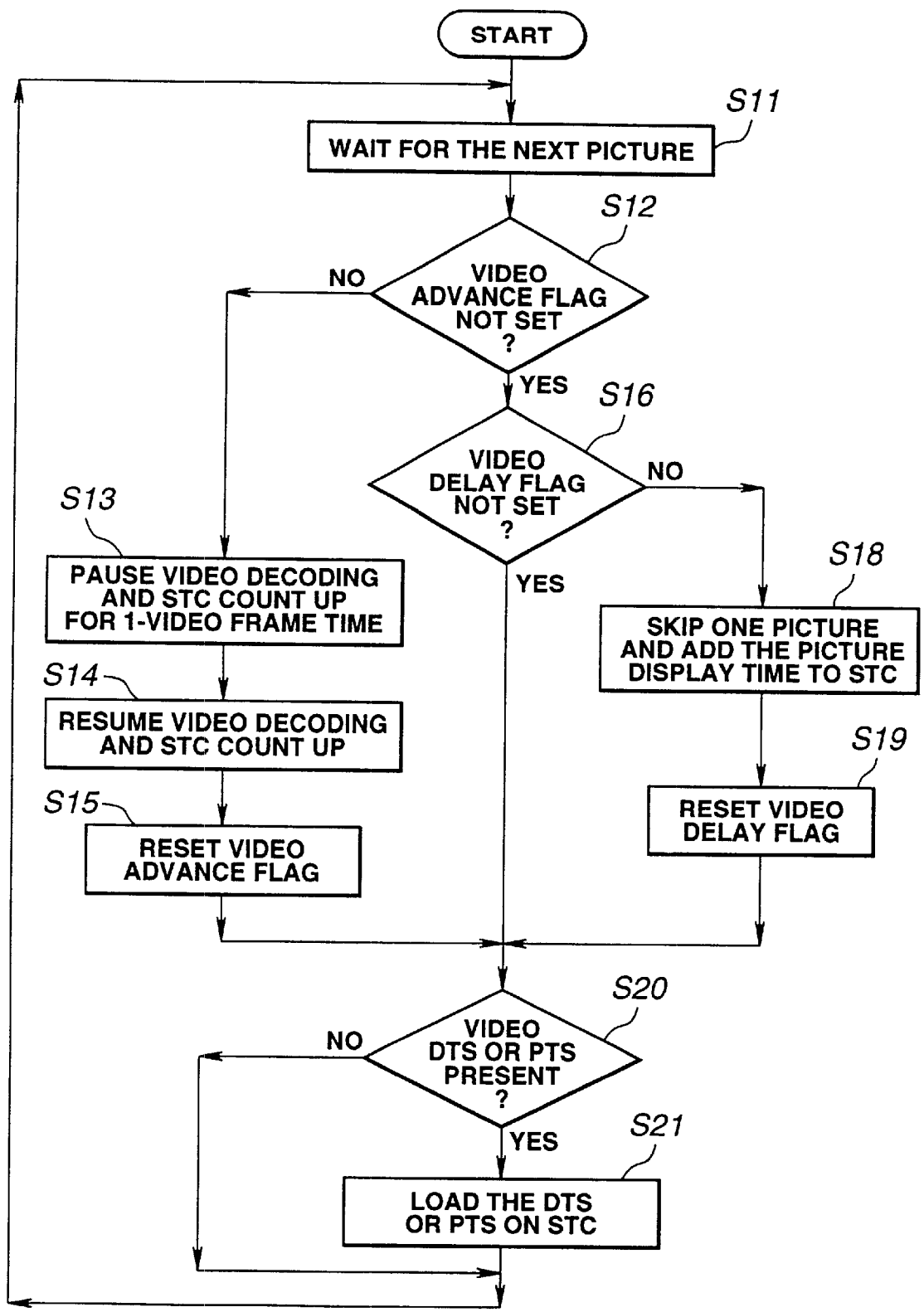
FIG. 4 is flowchart showing a synchronization lag countermeasure carried by the aforementioned DVD apparatus.

According to the aforementioned countermeasure flags, the controller 14 carries out the following as shown in FIG. 4. Firstly, in step S11, the system waits for the following picture and in step S12, it is determined whether the video advance flag is ON. Here, if the video advance flag is found to be on, control is passed to step S13 where the video decoder 7 is paused for 1-video frame time and simultaneously with the start of the pause of the video decoder, the STC is paused for 1-video frame time. After this, control is passed to step S14 where the video decoding is resumed and the STC count up is also resumed. In step S15, the video advance flag is reset.

If in step S12 it is determined that the video advance flag is not on and in step S16 it is determined that the video delay flag is on, it means that the STC has a delay with respect to the audio PTS, and in step S18 one picture is skipped. Simultaneously with the start of the skip by the video decoder 7, the STC is advanced by the display time of the picture skipped. After this, control is passed to step S19 where the video delay flag is reset.

After step S15 and step S19, it is determined whether a video DTS or PTS is present and in step S21 the DTS or PTS is loaded on the STC and control is returned to the aforementioned step S11.

In a case when there is found an advance of two or more video frame time, the video advance detection and the countermeasure are repeated until the synchronization is obtained. Moreover, in a case when there is found a delay of two or more video frame time, the video delay detection and the countermeasure are repeated until the synchronization is obtained.

It is also possible to change the number of pictures to be skipped and the pause time according to the synchronization lay amount.

It should be noted that the sub-picture, PCI, and closed caption which are sub-picture signals are decoded and reproduced according to the STC. This makes that other than the audio signal are synchronized with the STC, i.e., the video signal and only the audio signal is delayed within one video frame time.

Moreover, when reproducing a stream multiplexed by the MPEG system, in order to obtain a stable operation with synchronization not matched strictly, a decoder for decoding an elementary stream which is reproduced with a relative delay requires more code buffer than the originally required code buffer amount.

In the aforementioned apparatus in which an audio signal alone has a relative delay, an additional code buffer is required only at the stage preceding the audio decoder and it is possible to minimize the increase of the RAM amount.

It should be noted that the controller 14 may match the aforementioned STC with the decoding timing of the audio signal.

As has thus far been described, according to the present invention, it is possible to minimize the circuit size capable of error prevention without use of countermeasures for the respective error factors.

What is claimed is:

1. A synchronization error control apparatus comprising:
 a player for reproducing a multiplexed information signal formed from a coded video signal and a coded audio signal;
 a demultiplexer for isolating said coded video signal and said coded audio signal from said multiplexed information signal;
 a video decoder for decoding said coded video signal isolated by said demultiplexer to generate a decoded video signal;
 an audio decoder for decoding said coded audio signal isolated by said demultiplexer to generate a decoded audio signal; and
 a controller for resetting a system time clock serving as a system time reference for said apparatus with time management information contained in said decoded video signal, and for comparing said reset time with time management information included in said decoded audio signal;

wherein said comparison results in setting a video advance flag if the decoded video signal is temporally advanced in relation to the decoded audio signal or setting a video delay flag if the decoded video signal is temporally delayed in relation to said decoded audio signal, and wherein said controller uses said video advance flag or said video delay flag to control synchronization between said decoded video signals and said decoded audio signals.

2. A synchronization error control apparatus as claimed in claim 1, wherein if said video advance flag is set, said controller halts the decoding processing of said video decoder on a 1-frame time basis and together with this, halts counting of said system time clock.

3. A synchronization error control apparatus as claimed in claim 1, wherein if said video delay flag is set, said controller skips frames of predetermined symbols by said video decoder for a predetermined time and together with this, advances said system time clock by a display period of said frames.

4. A synchronization error control method comprising the steps of:

reproducing a multiplexed information signal formed from a coded video signal and a coded audio signal;

generating decoded video signals and decoded audio signals;

resetting a system time clock serving as a system time reference for said apparatus with time management information contained in said decoded video signals;

comparing said reset time with time management information contained in said decoded audio signals;

setting a video advance flag if the decoded video signal is temporally advanced in relation to the decoded audio signal or a video delay flag if the decoded video signal is temporally delayed in relation to said decoded audio signal; and controlling a synchronization error between said decoded video signal and said decoded audio signal with said video advance flags or said video delay flags.

5. A synchronization error control method as claimed in claim 4, further comprising the step of:

halting the decoder processing of said video decoder on 1-frame time basis and together with this, halting counting of said system time clock if said advance flag is set.

6. A synchronization error control method as claimed in claim 4, further comprising the step of:

skipping frames of a predetermined symbols by said video decoder for a predetermined time and together with this, advancing said system time clock by a display period of said frames if said delay flag is set.

7. A synchronization error control apparatus comprising:

a player for reproducing a multiplexed information signal formed from a coded video signal and a coded audio signal;

a demultiplexer for isolating said coded video signal and said coded audio signal from said multiplexed information signal;

a video decoder for decoding said coded video signal isolated by said demultiplexer to generate a decoded video signals;

an audio decoder for decoding said coded audio signal isolated by said demultiplexer to generate decoded audio signals; and a controller for resetting a system time clock serving as a system time reference for said apparatus with time management information included in said decoded video signal and for comparing said reset time with time management information included in said decoded audio signals;

wherein said comparison results in setting a video advance flag if the decoded video signal is temporally advanced in relation to the decoded audio signal or setting a video delay flag if the decoded video signal is temporally delayed in relation to said decoded audio signal, and wherein said controller uses said video advance flag or said video delay flag to match a decoding timing of said decoded video signal with a decoding timing of said decoded audio signal.

8. A synchronization error control apparatus as claimed in claim 7, wherein said controller, according to said video advance flag or said video delay flag, matches said system time clock with the decoding timing of said decoded audio signal.

9. A synchronization error control method comprising the steps of:

reproducing a multiplexed information signal formed from a coded video signal and a coded audio signal;

generating a decoded video signal and a decoded audio signal;

resetting a system time clock serving as a system time reference for said apparatus with time management information used when decoding said coded video signal;

comparing said reset time with the time management information included in said decoded audio signal;

setting a video advance flag if the decoded video signal is temporally advanced in relation to the decoded audio signal or a video delay flag if the decoded video signal is temporally delayed in relation to said decoded audio signal; and matching a decoding timing of said decoded video signal with a decoding timing of said decoded audio signal according to said video advance flag or said video delay flag.

10. A synchronization error control method according to claim 9, further comprising the step of:

matching said system time clock with the decoding timing of said audio signal according to said video advance flag or said video delay flag.

* * * * *